(12) United States Patent
Victorazzo

(10) Patent No.: US 9,278,748 B2
(45) Date of Patent: Mar. 8, 2016

(54) PROCESSES TO FABRICATE COMPOSITE TUBULAR-REINFORCED PANELS INTEGRATING SKIN AND STRINGERS AND THE PANELS THEREBY FABRICATED

(71) Applicant: EMBRAER S.A., São José dos Campos-SP (BR)

(72) Inventor: Danilo Seixas Victorazzo, S. J. Campos / SP (BR)

(73) Assignee: EMBRAER S.A., São José Dos Campos-SP (BR)

( * ) Notice: Subject to any disclaimer, the term of this patent is extended or adjusted under 35 U.S.C. 154(b) by 181 days.

(21) Appl. No.: 13/730,803

(22) Filed: Dec. 28, 2012

(65) Prior Publication Data
US 2014/0186588 A1 Jul. 3, 2014

(51) Int. Cl.
| | |
|---|---|
| B32B 37/00 | (2006.01) |
| B64C 1/06 | (2006.01) |
| B29C 70/28 | (2006.01) |
| B64C 1/12 | (2006.01) |
| B29C 70/86 | (2006.01) |
| B29D 99/00 | (2010.01) |
| B64C 1/00 | (2006.01) |
| B29C 70/44 | (2006.01) |
| B29C 70/68 | (2006.01) |

(52) U.S. Cl.
CPC .............. B64C 1/064 (2013.01); B29C 70/28 (2013.01); B29C 70/865 (2013.01); B29D 99/0017 (2013.01); B64C 1/12 (2013.01); B29C 70/44 (2013.01); B29C 70/683 (2013.01); B64C 2001/0072 (2013.01); Y02T 50/433 (2013.01); Y10T 156/10 (2015.01); Y10T 156/1002 (2015.01); Y10T 428/24661 (2015.01)

(58) Field of Classification Search
CPC .......... B64C 1/064; B64C 1/068; B64C 1/12; B29C 70/28; B29C 65/7808; B29C 66/7375; B32B 37/142; B29D 99/0014; Y10T 156/1089; Y10T 156/1093
See application file for complete search history.

(56) References Cited

U.S. PATENT DOCUMENTS

| | | | | |
|---|---|---|---|---|
| 3,995,081 | A * | 11/1976 | Fant ...................... | B29C 70/865 244/123.3 |
| 6,743,504 | B1 * | 6/2004 | Allen et al. ................... | 428/362 |
| 7,074,474 | B2 | 7/2006 | Toi et al. | |
| 8,043,554 | B2 | 10/2011 | Yip et al. | |
| 2007/0176327 | A1 * | 8/2007 | Petersson et al. ............. | 264/319 |
| 2009/0320398 | A1 * | 12/2009 | Gouvea ........................ | 52/309.1 |
| 2011/0027526 | A1 * | 2/2011 | McCarville et al. .......... | 428/116 |

FOREIGN PATENT DOCUMENTS

| | | |
|---|---|---|
| EP | 1 800 842 | 6/2007 |
| GB | 2 110 736 | 6/1983 |

\* cited by examiner

Primary Examiner — John Goff
(74) Attorney, Agent, or Firm — Nixon & Vanderhye P.C.

(57) ABSTRACT

Processes for fabricating an integrated fiber-reinforced cured resin-composite panel structure include forming a panel preform assembly by (i) positioning pre-cured fiber-reinforced resin-composite tubular stiffeners onto an uncured base skin, and (ii) applying uncured fiber-reinforced resin-composite overlapping layers onto the pre-cured stiffeners so that at least lateral edges of the overlapping layers are laminated to a corresponding region of the base sheet; and thereafter curing the fiber-reinforced resin-composite base skin and overlapping layers to thereby form an integrated composite panel structure.

12 Claims, 4 Drawing Sheets

PROCESSES TO FABRICATE COMPOSITE TUBULAR-REINFORCED PANELS INTEGRATING SKIN AND STRINGERS AND THE PANELS THEREBY FABRICATED

CROSS-REFENCE TO RELATED APPLICATION

The present application may be deemed to be related to commonly owned U.S. application Ser. No. 13/730,809 filed on Dec. 28, 2012, the entire content of which is expressly incorporated hereinto by reference.

FIELD

The embodiments disclosed herein relate generally to composite tubular-reinforced panels structures and to processes for fabricating the same. In some preferred embodiments, panels are provided which integrates the skin and stringers to form an integral composite structural panel for aircraft.

BACKGROUND

Aircraft manufacturers continuously attempt to improve aircraft performance by reducing both weight and manufacturing costs while maintaining or improving structural strength. One well-known method for increasing aircraft performance is to reduce airframe weight through the use of state-of-the-art materials, such as composites, having relatively high strength-to-weight and stiffness-to-weight ratios. Composite materials are generally described as being materials that include reinforcing fibers, such as graphite fibers, embedded in a polymeric matrix, such as an epoxy resin. Such materials will hereinafter be referenced as "fiber-reinforced composite" materials. Fiber-reinforced composite materials are usually supplied as fibrous sheets pre-impregnated with a curable or partially cured resin. The so-called "prepreg sheets" may then be laid up in laminated plies and cured to form rigid panel structures.

A variety of composite panel structures have been proposed as evidenced by EP 1800842, GB 2110736, U.S. Pat. No. 7,074,474 and U.S. Pat. No. 8,043,554, the entire contents of each being expressly incorporated hereinto by reference.

According to EP 1800842, an elongate structural element and a rigid shell structure integrated with at least one elongate stiffening element are proposed. A preformed, form-stable former is provided having a hat profile with two inwardly directed opposing flange portions, covering the former with a curable composite material to form an external hat profile having outwardly directed flanges. The assembly is integrated with either a curable or preformed shell structure of composite material. One disadvantage of this proposal, however, is that in the event of laminate detachment (peeling), the structure looses its closed section functionality.

GB 2110736 discloses an stiffened panel of fiber reinforced plastics material having a base web, a stringer element in the form of a strip of carbon reinforced plastics material wrapped around a mandrel to define a cavity and having its lower side bonded to the base web.

According to U.S. Pat. No. 7,074,474, a composite material-stiffened panel is provided which has a skin obtained by molding a fiber-reinforced resin composite material into a flat skin and stiffeners arranged in rows on one surface of the skin. A fiber-reinforced resin-composite material is stitched on the skin covering the stiffeners.

U.S. Pat. No. 8,043,554 describes structures having composite hat stringers. The structures are fabricated by placing prepreg layers into a mold tool base to form an exterior hat portion of the stringer. An inflatable bladder may be used during the curing process so as to create compressive forces in conjunction with the mold tool to compress each of the wall portions of the stringer.

While the various proposals noted above are suitable for their intended uses, there is still a need for improvements. It is therefore toward providing improvements to the integrated composite structural panels and processes for fabricating the same as known in the art that the embodiments of the present invention are directed.

SUMMARY

The disclosed embodiments herein are directed toward integrated composite structural panels having a skin and elongate stringers integrated to the skin. The stringers serve the dual function of tooling during the integrated curing of the components (i.e., by virtue of the stringers being pre-cured and the skin being uncured or partially cured) as well as providing structural reinforcement to the panel following integration by curing.

According to some embodiments, processes are provided for fabricating an integrated fiber-reinforced cured resin-composite panel structure include forming a panel preform assembly by (i) positioning pre-cured fiber-reinforced resin-composite tubular stiffeners onto an uncured base skin, and (ii) applying uncured fiber-reinforced resin-composite overlapping layers onto the pre-cured stiffeners so that lateral edges of the overlapping layers are laminated to a corresponding region of the base sheet; and thereafter curing the fiber-reinforced resin-composite base skin and overlapping layers to thereby form an integrated composite panel structure.

According to certain embodiments, uncured fiber-reinforced resin-composite pad strips may optionally be laid up on the base sheet with the cured stiffeners positioned on the pad strips. A plurality of fiber-reinforced resin-composite sheets may be laid up onto a surface of a male forming tool to form the base skin.

Certain embodiments will include the introduction of a filler material in spaces between the overlapping layer and the pre-cured stiffener.

The preform assembly comprised at least of the uncured base skin, pre-cured stiffeners and uncured overlapping layers on the male tooling may be enveloped in a vacuum bag and subjected to resin curing conditions (e.g., elevated temperatures of about 180° C. and pressures of about 100 psi sufficient to cure (harden) the resin).

According to some embodiments, the pre-cured stiffeners are tubular trapezoidal stiffeners that may be formed of multiple plies of cured fiber-reinforced resin-composite sheets. The pre-cured trapezoidal stiffener may include cured filler between at least adjacent ones of the plies. Optionally, an uncured bonding film may be provided on an exterior surface of the pre-cured stiffener so as to enhance bonding with the uncured base skin, overlapping layer and/or pad strips during the resin curing step.

These and other aspects and advantages of the present invention will become more clear after careful consideration is given to the following detailed description of the preferred exemplary embodiments thereof.

BRIEF DESCRIPTION OF ACCOMPANYING DRAWINGS

The disclosed embodiments of the present invention will be better and more completely understood by referring to the following detailed description of exemplary non-limiting illustrative embodiments in conjunction with the drawings of which:

Figure 4:
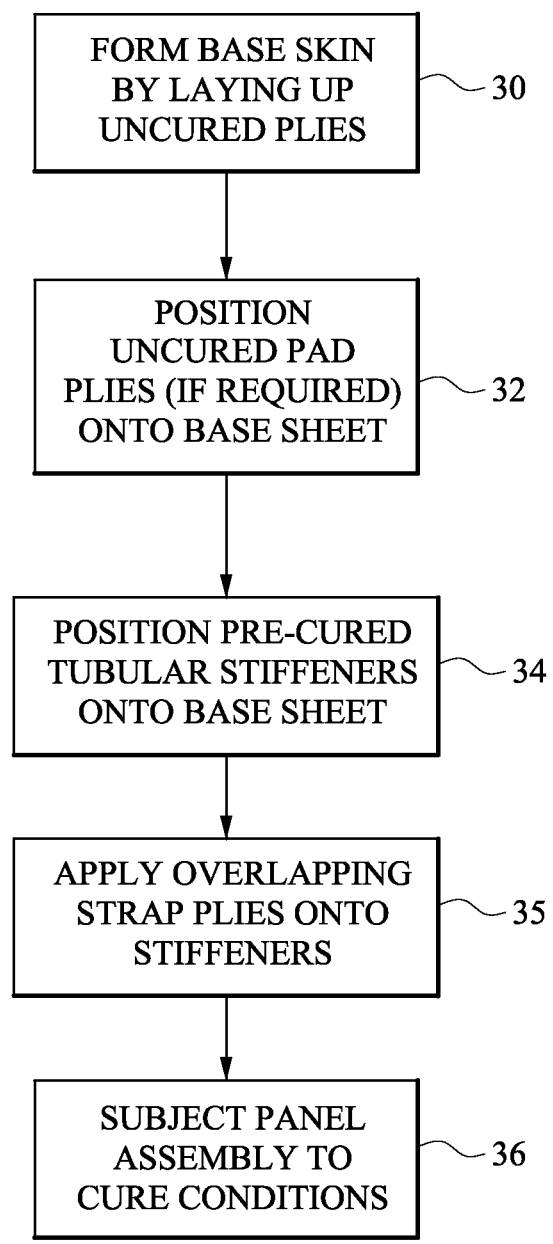
FIG. 4 is a process flowchart for fabricating the integrated panel shown in FIG. 1.
Figure 4A:
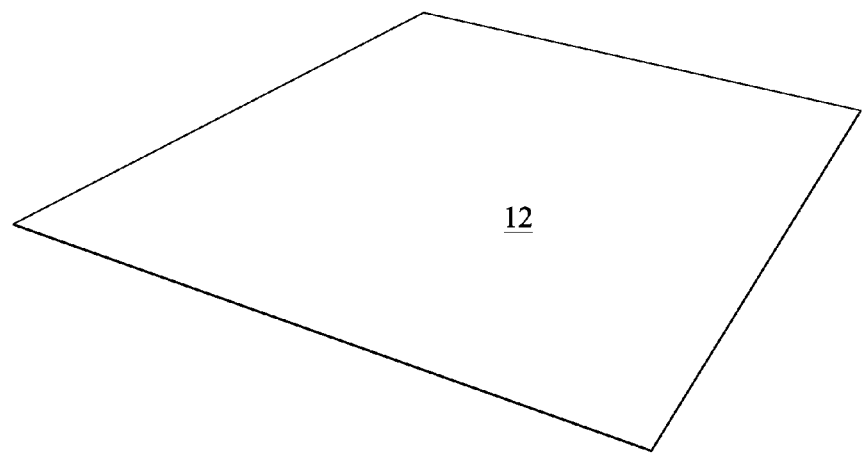
Figure 4B:
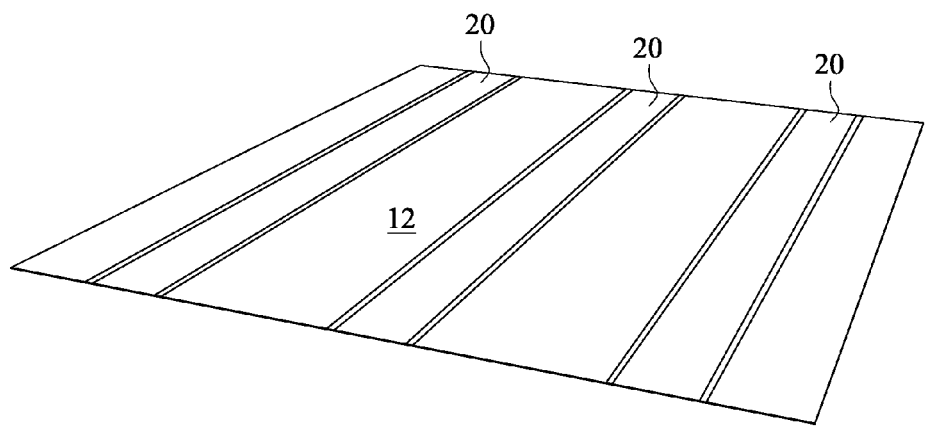
Figure 4C:
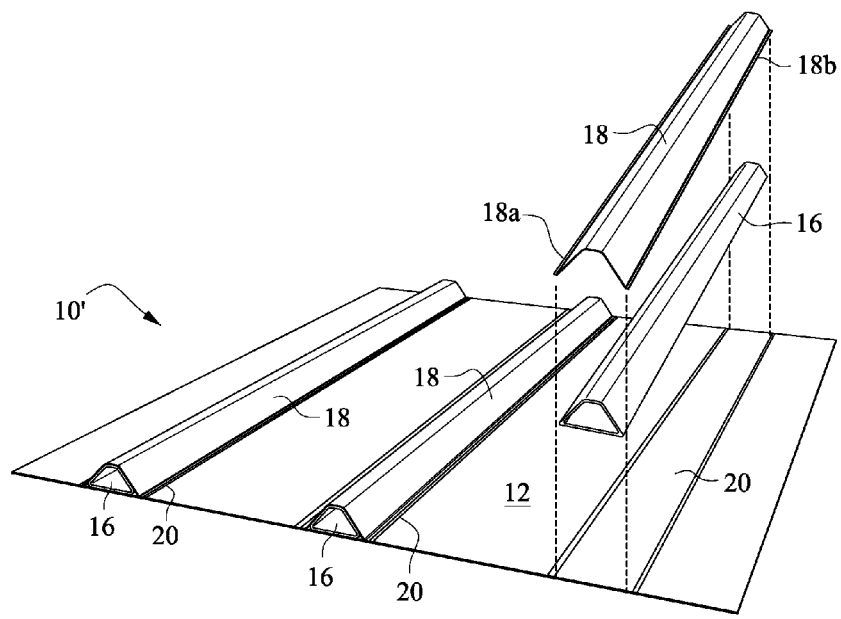
Figure 5:
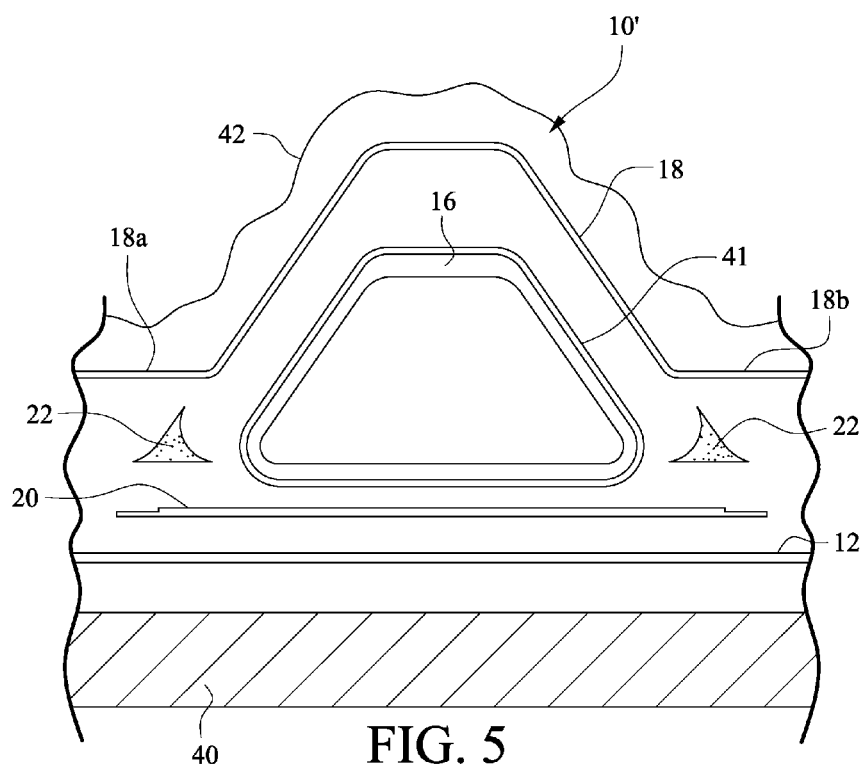

FIGS. 4A-4C schematically show the various fabrication steps to form the integrated panel structure according to the flowchart depicted in FIG. 4; and FIG. 5 is an exploded view of a panel preform assembly suitable for curing into an integrated panel structure.

DETAILED DESCRIPTION

Figure 1:
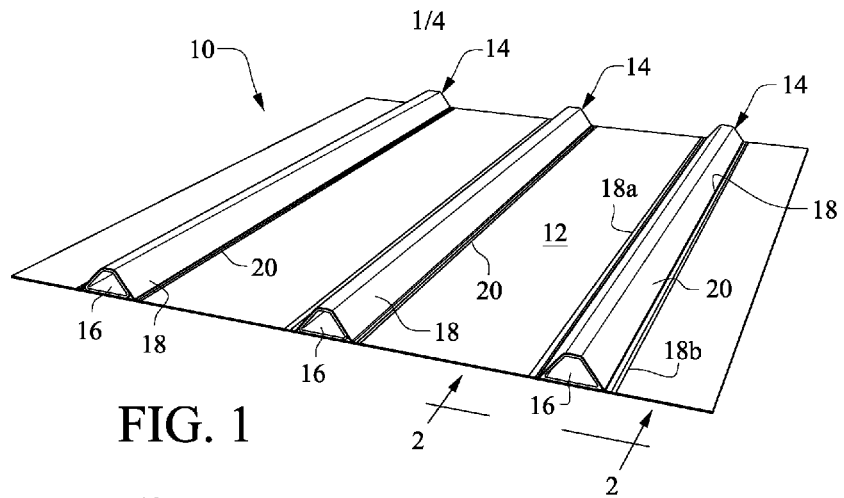
FIG. 1 is a perspective view of an integrated panel structure comprising a base skin and elongated stringers integrated with one another according to an embodiment of the invention.
Figure 2:
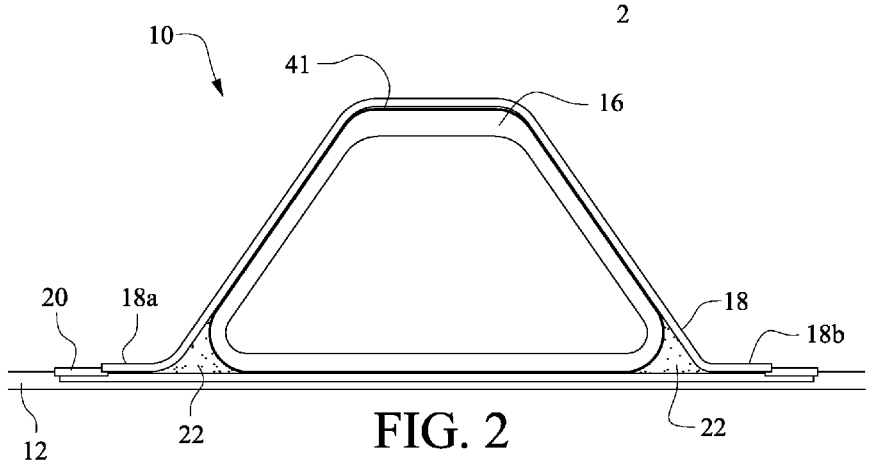
FIG. 2 is an enlarged end elevation view of the panel shown in FIG. 1 as taken along line 2-2 therein.

An integrated panel structure 10 according to an embodiment of the invention is depicted in FIG. 1 as including a base skin 12 comprised of several plies of fiber-reinforced composite sheets and a plurality of elongate stringers 14 integrated to the base skin 12. As is perhaps better shown in FIG. 2, the stringer 14 includes a pre-cured tubular trapezoidal stiffener 16 which is integrated to the skin 12 by means of an overlapping strap layer 18 formed of one or more plies of curable fiber-reinforced composite sheets. One or more pad plies 20 may be provided in strips on the base skin 12 to facilitate the integration of the stiffener 16 thereto. Space between the stiffener 16 and the overlapping strap ply 18 may be filled by a curable resin filler material 22.

Figure 3:
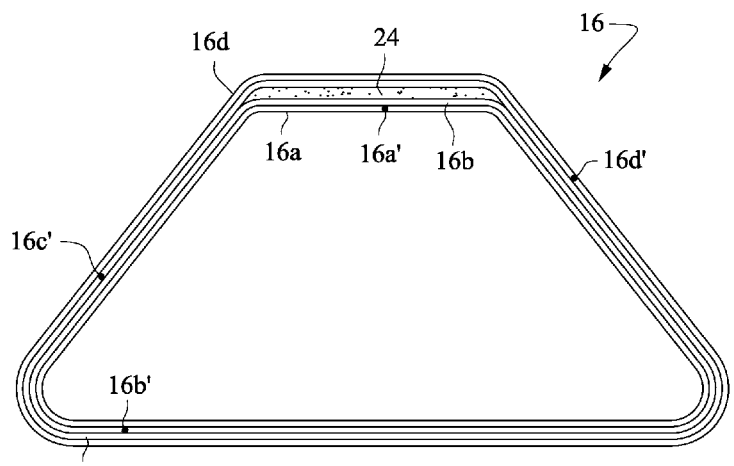
FIG. 3 is an end elevation view of a pre-cured stiffener employed in the integrated panel shown in FIG. 1.

The pre-cured rigid tubular stiffener 16 is depicted in greater detail in FIG. 3. As shown, the stiffener 16 is formed of a number of plies 16a-16d that are butt-seamed at locations 16a'-16d' to form a tubular structure. In order to achieve the desired height dimension, a number of filler plies or filler material 24 may be interposed between the inner plies 16a-16b and the outer plies 16c-16d. The various plies 16c-16d, and optionally filler plies or material 24 may be laid up on suitable tooling and cured under autoclave curing conditions (e.g., elevated temperatures of about 180° and pressures of about 110 psi) to form the pre-cured rigid tubular stiffener 16. As will be discussed in greater detail below, the strength and rigidity of the pre-cured tubular stiffener 16 allows it to perform the dual function of tooling during the integrated curing of the components as well as providing structural reinforcement to the panel following integration by curing.

Accompanying FIG. 4 and FIGS. 4A-4D depict the fabrication sequence to form the integrated panel depicted in FIG. 1. Specifically, in step 30 of FIG. 4 a preform of the base skin 12 is constructed by laying up a desired number of plies of uncured fiber-reinforced composite sheets onto a male tool (i.e., a flat tool 40 as shown in FIG. 5). Such a state is depicted in FIG. 4A. Thereafter, uncured strips of fiber-reinforced composite sheets may optionally be laid-up in step 32 to form uncured pad strips 20. Such a state is depicted in FIG. 4B.

The pre-cured trapezoidal stiffeners 16 are placed in step 34 onto the uncured base sheet 12 (e.g., onto the pad strips 20 if present as shown in FIG. 4C) and in step 35 each trapezoidal stiffener is covered with an uncured overlapping strap layer 18. Each of the overlapping strap layers or plies 18 has a sufficient widthwise dimension so that at least lateral edges 18a, 18b thereof are laminated to the base sheet 12.

The overlapping strap layers or plies 18 as depicted are in the form of individual strap plies having a sufficient widthwise dimension so as to be laminated with respect to a corresponding region of the base skin 12 laterally of the stiffeners 16. Alternatively (or additionally), the overlapping strap layers or plies 18 may comprise continuous plies which overlap exterior surfaces of the stiffeners 16 (not including the exterior surfaces of the base of the stiffeners 16) and regions of the base skin 12 therebetween. In such embodiments, therefore, one or more layers or plies of prepreg sheets (not shown) may be positioned over the overlapping layer and the base skin 12 in the regions defined between the stiffeners 16, in which case such additional layers or plies of prepreg sheets may be cross-plied with respect to the continuous overlapping layer 18.

As is shown in FIG. 4C, the stiffeners 16 are elongate structures which are placed onto the base skin 12 in spaced-apart parallel arrangement relative to one another. The separation spacing between adjacent ones of the stiffeners 16 may be uniform or non-uniform as may be desired for a specific panel structure design. A bonding film 41 may be provided on an exterior surface of the pre-cured stiffener 16 so as to facilitate bonding between the stiffener 16, the overlapping strap layer 18 and the base skin 12 and/or pad strips 20. The bonding film 41 may be a layer formed e.g., of a resin that cures at the elevated temperatures and pressures of the composite materials in the assembly 10'.

At this stage of the fabrication process, the filler material 22 may be positioned as needed between the stiffeners 16 and their respective overlapping strap layer 18 as shown in FIG. 5. Such a preform assembly (designated 10' in FIG. 4C) comprised of the uncured base sheet 12, the cured stiffeners 16, the uncured overlapping strap layer 18, uncured filler material 22 and uncured pad strips 20 (if present) may then be subjected to curing conditions (e.g., elevated temperatures of about 180° and pressures of about 110 psi) in step 36 of FIG. 4 to cure all previously uncured components simultaneously (co-cure) and to provide the integrated panel 10 as shown in FIG. 1.

The preform assembly 10' is shown in an exploded view of FIG. 5 for ease of understanding. As shown, the preform assembly 10' is assembled onto a surface of a rigid flat male forming tool 40 and is entirely enveloped within a vacuum bag 42. The preform 10' on the male forming tool 40 enveloped by the vacuum bag 42 may then be placed in an autoclave and subjected to elevated temperature and pressure as described above sufficient to cure (harden) the resin in the uncured (or partially cured) plies and thereby integrate all components together to form the panel 10 shown in FIG. 1.

Various modifications within the skill of those in the art may be envisioned. For example, although the male tool 40 is depicted as being planar, it may be concavely curved with cavities in the form of a female tool (e.g., as disclosed in the above-cited U.S. application serial No. 13/730,809) so as to form corresponding curved integrated panels 10 (e.g., that may be employed as sections of an aircraft fuselage).

Therefore, while the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope thereof.

What is claimed is:
1. A process for fabricating an integrated fiber-reinforced cured resin-composite panel structure comprising:
 (a) fabricating a panel preform assembly by:

(i) laying up uncured fiber-reinforced resin-composite pad strips on an uncured base skin such that the pad strips are spaced apart and extend substantially parallel relative to one another;

(ii) providing a plurality of rigid elongate pre-cured fiber-reinforced resin-composite tubular trapezoidal stiffeners comprised of multiple butt-seamed inner and outer plies of cured fiber-reinforced resin-composite sheets, and a filler between adjacent ones of the inner and outer plies at an upper end of the stiffener;

(iii) positioning the pre-cured tubular trapezoidal stiffeners onto the uncured fiber-reinforced resin-composite pad strips laid up on the uncured base skin according to step (a)(i), and (iv) applying uncured fiber-reinforced resin-composite overlapping strap layers onto the pre-cured tubular trapezoidal stiffeners, the strap layers having a sufficient widthwise dimension so as to overlap exterior surfaces of the stiffeners and provide opposed lateral regions thereof which are laminated to respective corresponding regions of the base skin laterally adjacent to the stiffeners; and (b) curing the panel preform assembly fabricated according to step (a) to thereby form an integrated fiber-reinforced cured resin-composite panel structure.

2. The process of claim 1, wherein step (a) comprises laminating a plurality of fiber-reinforced resin-composite sheets onto a surface of a male forming tool to form the base skin.

3. The process of claim 1, wherein step (a) comprises introducing an uncured filler material in spaces between the overlapping strap layers and the pre-cured tubular trapezoidal stiffeners.

4. The process of claim 1, wherein step (b) comprises enveloping the panel preform assembly in a vacuum bag and subjecting the panel preform assembly to resin curing conditions.

5. The process of claim 4, wherein the resin curing conditions comprise an elevated temperature of about 180° C. and an elevated pressure of about 100 psi.

6. The process of claim 1, further comprising applying a bonding film onto the exterior surfaces of the pre-cured trapezoidal stiffeners and applying the strap layers onto the bonding film.

7. A process for forming an integrated panel structure which comprises the steps of:

(a) providing a panel preform assembly comprised of:

(i) an uncured fiber-reinforced resin-composite base skin, (ii) a plurality of uncured fiber-reinforced resin-composite pad strips laid up on the uncured base skin such that the pad strips are spaced apart and extend substantially parallel relative to one another, (iii) a plurality of rigid pre-cured fiber-reinforced resin-composite elongate tubular trapezoidal stiffeners each being positioned on a respective one of the pad strips and comprised of multiple butt-seamed inner and outer plies of cured fiber-reinforced resin-composite sheets, and a filler between adjacent ones of the inner and outer plies at an upper end of the stiffener, and (iv) uncured fiber-reinforced resin-composite overlapping strap layers positioned over the pre-cured stiffeners, the strap layers having a sufficient widthwise dimension so as to overlap exterior surfaces of the stiffeners and provide opposed lateral regions thereof which are laminated to respective corresponding regions of the base skin laterally adjacent to the stiffeners; and thereafter (b) subjecting the panel preform assembly of step (a) to curing conditions to thereby obtain an integrated panel structure.

8. The process of claim 7, which further comprising positioning the panel preform assembly onto a surface of a male forming tool.

9. The process as in claim 7, wherein the panel preform assembly further comprises an uncured filler material within spaces defined between the overlapping strap layers and the pre-cured tubular trapezoidal stiffeners.

10. The process of in claim 7, wherein step (b) comprises enveloping the panel preform assembly in a vacuum bag and subjecting the preform assembly to resin curing conditions.

11. The process of claim 10, wherein the resin curing conditions comprise an elevated temperature of about 180° C. and an elevated pressure of about 100 psi.

12. The process of claim 7, wherein the panel pre-form assembly further comprises a bonding film between the exterior surfaces of the pre-cured trapezoidal stiffeners and the strap layers.

* * * * *